(12) United States Patent
Kain et al.

(10) Patent No.: US 6,428,100 B1
(45) Date of Patent: Aug. 6, 2002

(54) JUVENILE TRANSPORTATION SYSTEM

(75) Inventors: James M. Kain, Troy, OH (US); Eugene Balensiefer, Saymour, IN (US); Steven Oltman; William Horton, both of Hope, IN (US); Richard Glover, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/825,035

(22) Filed: Apr. 3, 2001

(51) Int. Cl.[7] .................................................. A47C 1/08
(52) U.S. Cl. ................................. 297/256.16; 297/130
(58) Field of Search ............................ 297/130, 256.13; 280/30, 33.993, 647, 648, 650, 657, 658, 47.38

(56) References Cited

U.S. PATENT DOCUMENTS

| | | | |
|---|---|---|---|
| 5,431,478 A | * | 7/1995 | Noonan ............. 297/256.16 X |
| 5,625,956 A | | 5/1997 | Cone, II et al. |
| 5,772,279 A | * | 6/1998 | Johnson, Jr. ....... 297/256.16 X |
| D402,477 S | | 12/1998 | Cone, II |
| 6,000,753 A | | 12/1999 | Cone, II |
| 6,017,088 A | * | 1/2000 | Stephens et al. ........ 297/256.16 |
| 6,070,890 A | * | 6/2000 | Haut et al. .......... 297/256.16 X |

FOREIGN PATENT DOCUMENTS

EP            0164909      * 12/1985    ................. 297/130

OTHER PUBLICATIONS

Prior Art, Cosco Eddie Bauer Gear 2000–2001 Catalogue, cover sheet and pp. 2, 4, 11, 12, 14, 19.

* cited by examiner

*Primary Examiner*—Laurie K. Cranmer
(74) *Attorney, Agent, or Firm*—Barnes & Thornburg

(57) ABSTRACT

A juvenile transportation system is provided which includes a seat shell detachably mountable on a small base wherein the small base is formed to be mounted on a vehicle seat with a seat belt. The small base is adapted to be mounted on a rear portion of a vehicle seat such that a portion of the seat shell lies on a forward portion of the vehicle seat when the seat shell is coupled with the small base. A large base can also be provided, the seat shell being adapted to be mounted on either the small base or the large base.

21 Claims, 7 Drawing Sheets

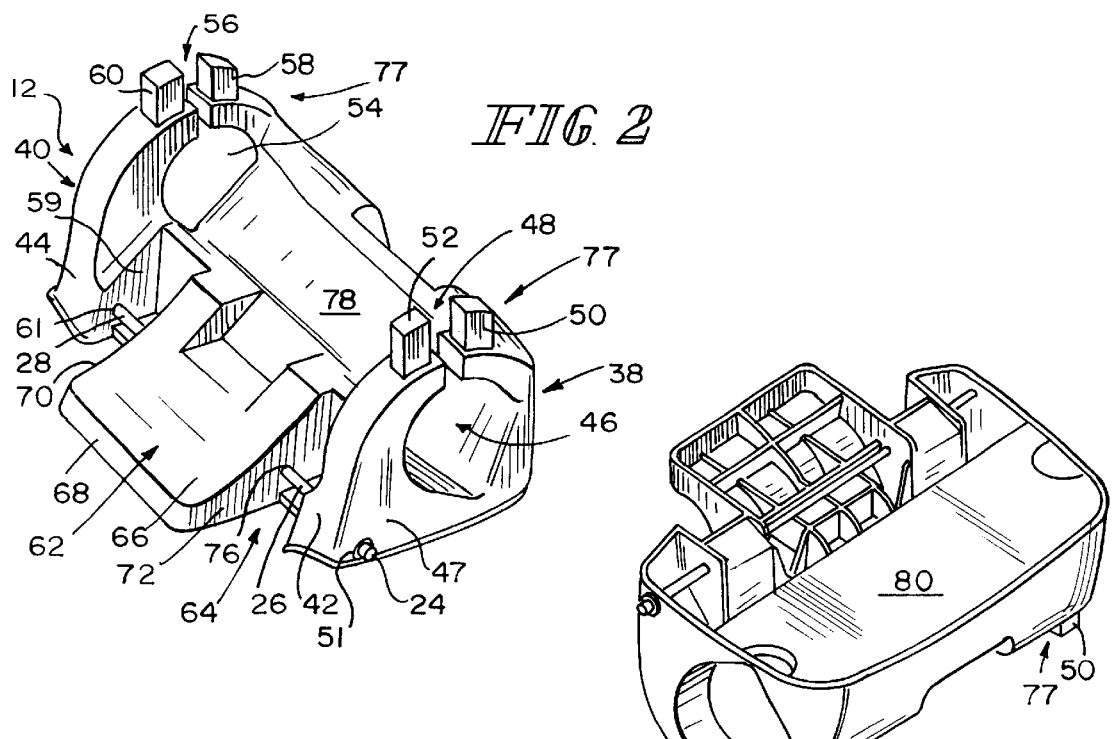
FIG. 2
FIG. 3
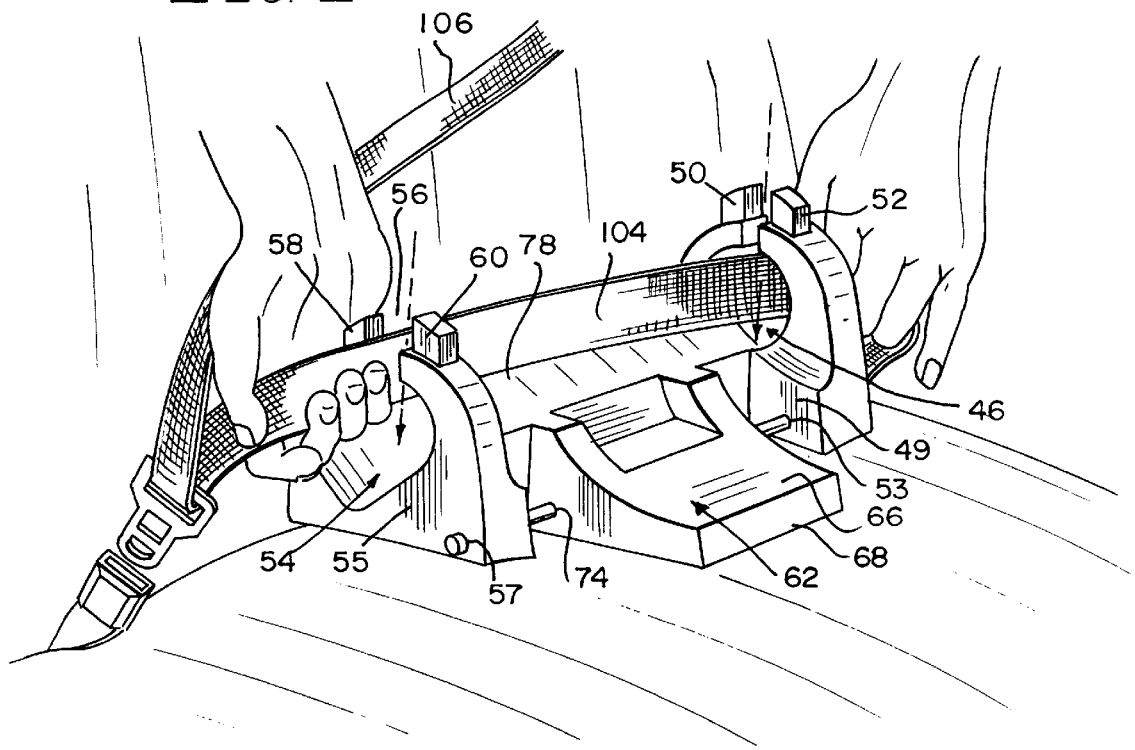
FIG. 4

JUVENILE TRANSPORTATION SYSTEM

BACKGROUND AND SUMMARY OF THE INVENTION

The present invention relates to a juvenile transportation system, and particularly, to a juvenile transportation system including a seat shell, a small seat base adapted to be mounted in a vehicle, and a large seat base adapted to be mounted in a vehicle. More particularly, the present invention relates to a juvenile transportation system wherein the seat shell is adapted to be coupled to any one of the small base, the large base, or a stroller.

Juvenile transportation systems and juvenile vehicle seat systems are used to transport young children and to secure young children safely within a vehicle. Often, juvenile vehicle seat systems include a base that rests in a vehicle seat and a seat shell adapted to be decoupled from the base and used as a juvenile carrier. The base is adapted to receive a lap belt, and the seat shell couples to and decouples from the base without necessitating the removal of the lap belt. In some embodiments, the juvenile transportation system can comprise a seat shell adapted to be coupled to a stroller as a further transportation option.

In this description and in the claims, the terms such as "forward portion", "rearward portion", and "rear portion" are used with reference to the "front" and "rear" of the vehicle. For example, in a vehicle with a rear or back seat, the position of the seat adjacent the back of the seat is the "rear portion" and the portion of the seat facing the front of the vehicle is the "front portion" or "forward portion". Thus, the juvenile seat shell placed on the vehicle rear seat faces "rearwardly" and has a "rear portion" adjacent the back of the seat and a "front portion" or "forward portion" disposed toward the front of the vehicle.

According to the present invention, a juvenile vehicle seat system comprises a seat base adapted to be mounted on the rear portion of a vehicle seat with a seat belt, and a seat shell having a bottom surface that includes a mounting portion or rearward portion and a non-mounting portion or forward portion. The seat base is configured such that the mounting portion of the seat shell detachably couples with the seat base while the non-mounting portion lies on the vehicle seat forward of the seat base.

In another embodiment, a juvenile transportation system is provided which comprises a seat shell in combination with a small base and a large base. The seat shell comprises a bottom having a mounting or rearward portion and a non-mounting forward portion, and the seat shell is adapted to be coupled to one of the small base or the large base. The large base is mountable on the vehicle seat and configured to couple to the mounting portion and support both the mounting portion and the non-mounting portion of the seat shell. The small base is mountable on the rearward portion of the vehicle seat and configured to couple to and support only the mounting portion or rearward portion of the seat shell.

In yet another embodiment, the juvenile transportation system further includes a stroller which is also configured to be coupled with the seat shell.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a top perspective view of the seat base of FIG. 1, showing the rod being positioned to extend through the body of the seat base and the mounting posts being positioned to lie in spaced-apart relation so as to allow for passage of a seat belt between the mounting posts on each side of the seat base;

FIG. 3 is a bottom perspective view of the seat base of FIG. 2 showing portions of the rod extending through the seat base and showing the bottom support surface;

FIG. 4 is another perspective view of the seat base of FIGS. 1–3, showing the seat base resting on a vehicle seat and receiving a vehicle seat belt through slots formed between the spaced-apart mounting posts;

DETAILED DESCRIPTION OF THE DRAWINGS

Figure 13:
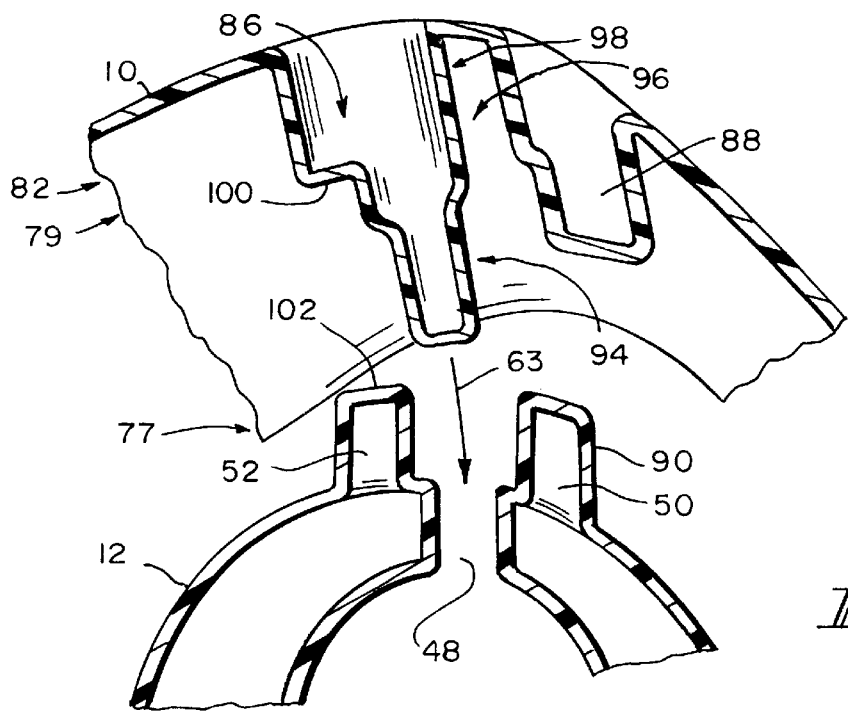
FIG. 13 is a sectional view similar to that of FIG. 12 of the tooth and rib of the seat shell positioned to interlock with the spaced-apart mounting posts formed in the seat base.
Figure 14:
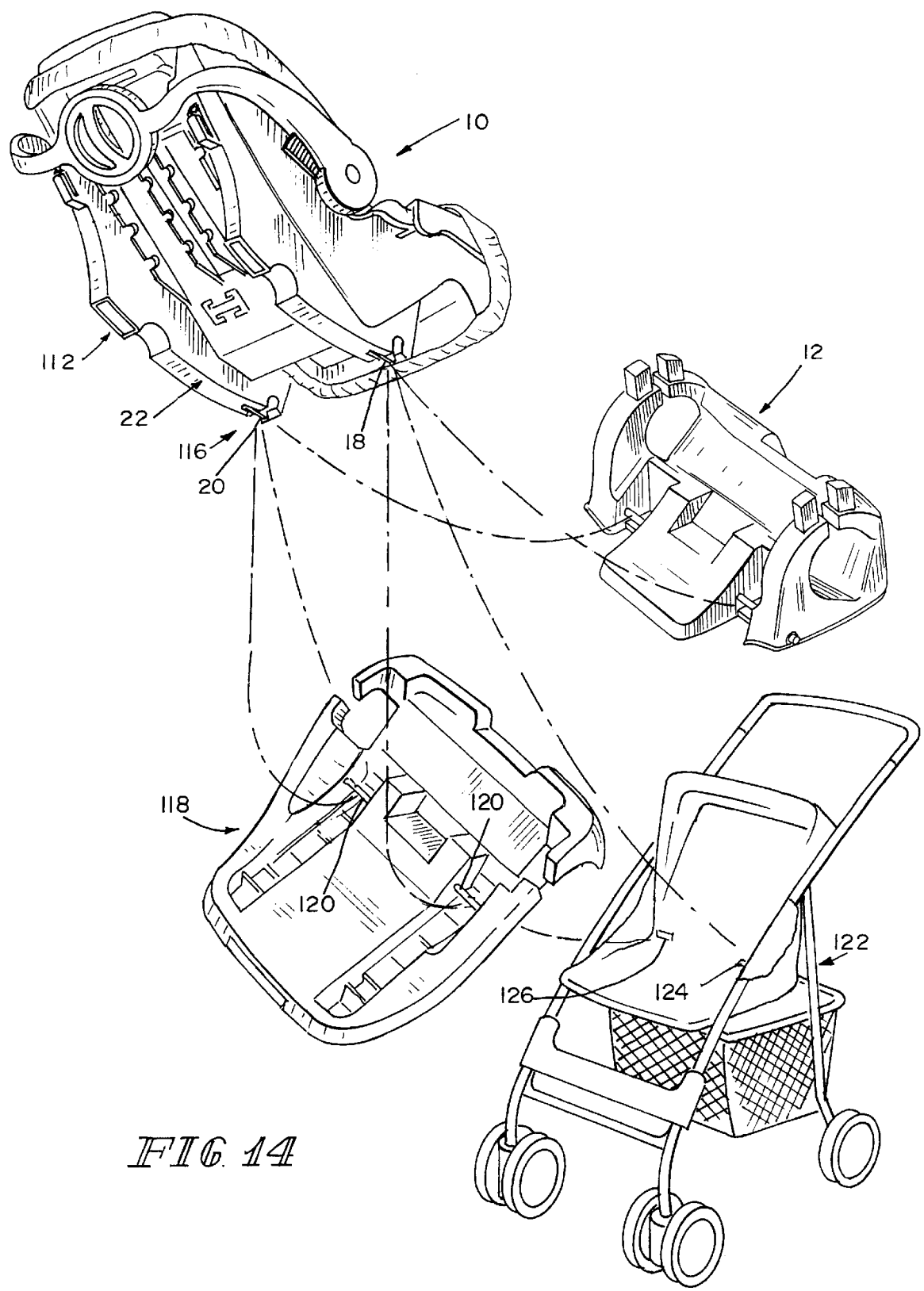
FIG. 14 is a perspective view of the seat shell in combination with the small base shown in FIGS. 1–13, a large base that is capable of supporting the entire bottom surface of the seat shell on a vehicle seat, and a stroller.

A juvenile transportation system is provided that includes a seat shell capable of being selectively coupled to either a small base adapted for mounting on a vehicle seat, a large base adapted for mounting on a vehicle seat, or a stroller, as shown in FIG. 14. Additionally, the seat shell can be mounted directly on the vehicle seat. The manner in which the seat shell is mounted to the small base is shown in FIGS. 1–13.

Figure 1:
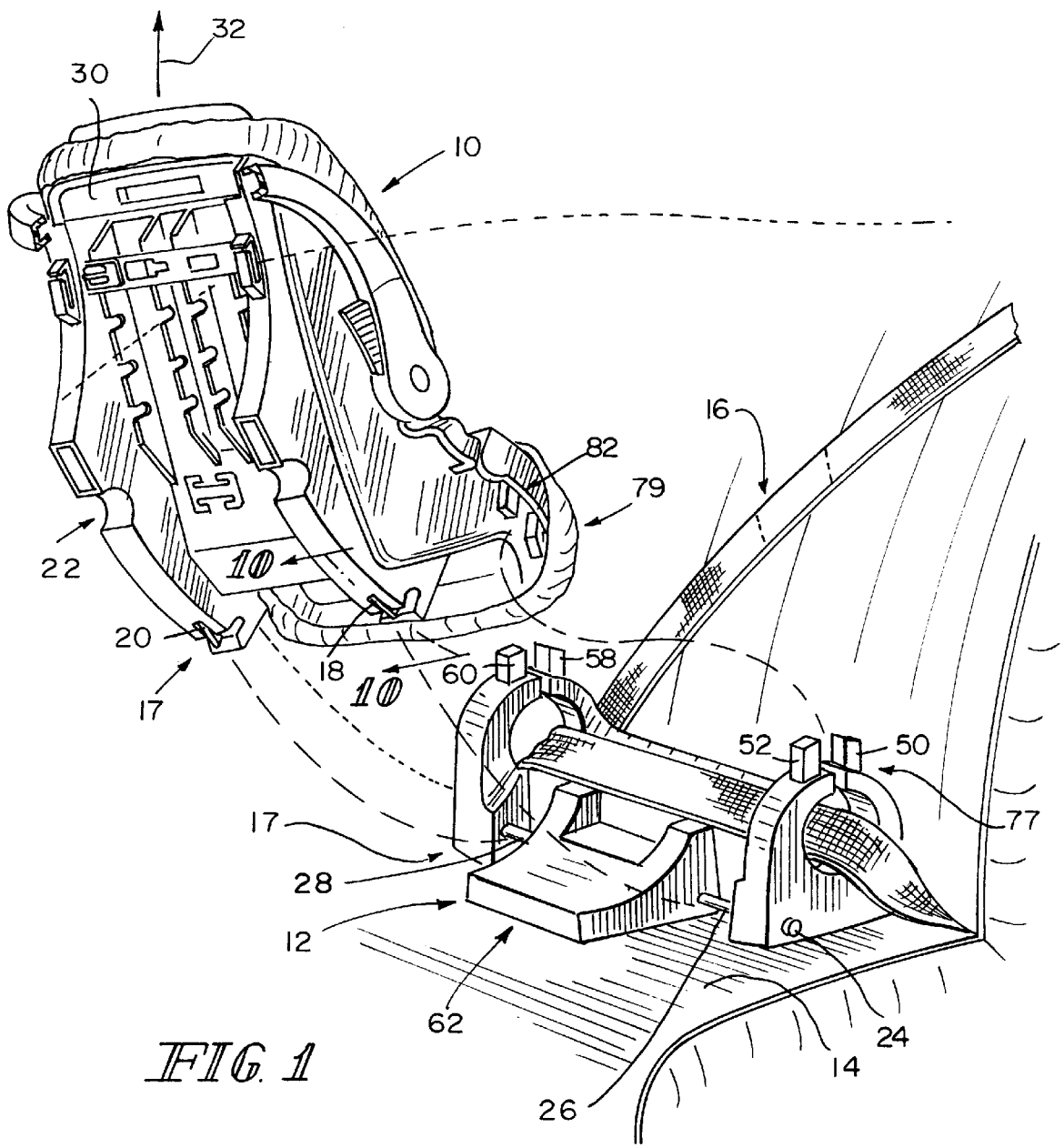
FIG. 1 is a perspective view of a seat base adapted to be secured to a vehicle seat by a vehicle seat belt and further adapted to receive a seat shell using the combination of an interlock and a retainer, the seat shell having a non-mounting portion adapted to rest on the vehicle seat, and a mounting portion adapted to rest on the seat base and to be coupled to the seat base by the retainer, the retainer including movable retainer latch members for engaging spaced apart sections of a rod coupled to the seat base, and the interlock including two upright mounting posts at each end of the base arranged to mate with a tooth and rib coupled to each side of the seat shell.

A seat shell 10 is shown in FIG. 1 ready to be coupled to small base 12, the small base 12 being mounted on a vehicle seat 14 and secured to the vehicle seat 14 with seat belt 16. A retainer 17 is used to couple the seat shell 10 to the small base 12. One embodiment is shown in FIG. 1, wherein retainer 17 comprises movable latch members 18, 20 on the bottom 22 of seat shell 10. Retainer 17 further comprises rod 24, wherein the movable latch members 18, 20 are adapted to be releasably coupled to rod 24 at first latching portion 26 and second latching portion 28, respectively, with the actuation of actuator handle 30. Seat shell 10 can be seen coupled to small base 12 in FIGS. 7 and 8. It should be understood that while one embodiment of retainer 17 is shown, other means of coupling seat shell 10 to small base 12 are within the scope of this disclosure.

Figure 9:
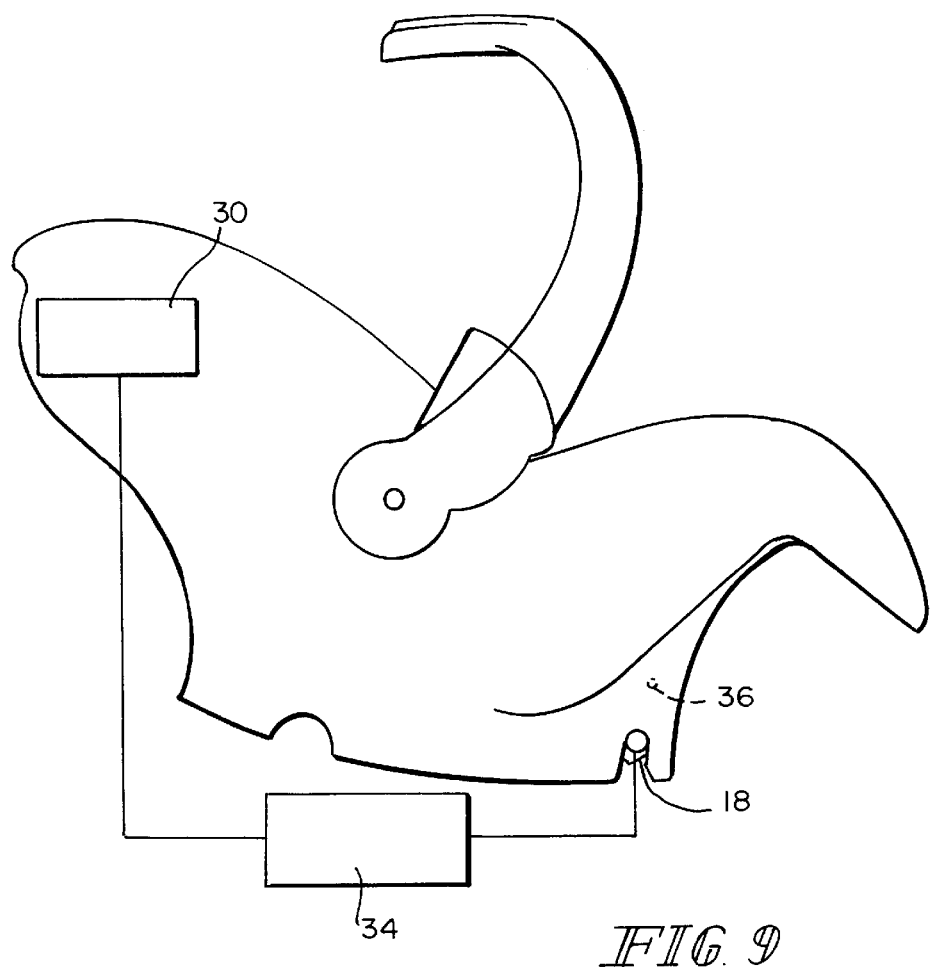
FIG. 9 is a diagrammatic side elevation view of the seat shell and seat base showing a retainer mechanism for connecting and releasing the detachable seat shell from the base, and showing the seat shell coupled to the base by the movable latch members (one of which is shown in phantom)
Figures 10, 11:
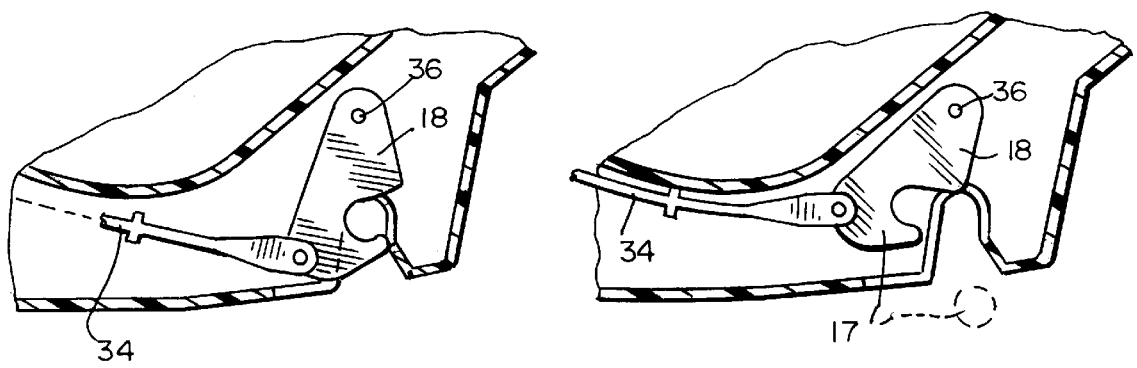
FIG. 10 is a sectional view of the seat shell taken along line 10—10 of FIG. 1, showing the movable latch member in a "closed" position prior to coupling of the movable latch member to the rod coupled to the seat base.
FIG. 11 is a sectional view similar to that of FIG. 10, showing the movable latch member in an "opened" position, ready to engage the rod (shown in phantom)

Actuator handle 30 can be pulled in direction 32, as shown in FIG. 1, causing actuator link 34 to move movable latch-members 18, 20 as shown in FIGS. 9–11. When actuator handle 30 is in the released position, movable latch member 18 is in the engaged position shown in FIG. 10. Likewise, when actuator handle 30 is pulled in direction 32, movable latch member 18 rotates about pivot axis 36 thereby disengaging movable latch member 18 from rod 24. Actuator link 34 can be any means known in the art that can transfer a pulling force imparted on the actuator handle 30 to a movable latch member 18 such that the movable latch member 18 can be disengaged from rod 24 or any other securing means.

For purposes of discussion, small base 12 is disclosed herein as having a "right wall" 38, a "left wall" 40, and a "front" 64, although other configurations are within the scope of the disclosure. In one embodiment shown in FIG. 2, small base 12 comprises a right wall 38 and a left wall 40, each wall having a leading edge 42, 44, consecutively. Right wall 38 is formed to include an inverse "D"-shaped aperture 46 with a slotted top access 48 Right wall 38 further includes rear mounting post 50 and front mounting post 52. Rear mounting post 50 is formed in right wall 38 immediately to the rear of slotted top access 48. Front mounting post 52 is formed in right wall 38 immediately in front of slotted top access 48. Slotted top access 48 is wide enough to provide space for vehicle seat belt 16 to be inserted into the "D"shaped aperture, as shown in FIG. 4. Right wall 38 additionally includes an aperture 51 formed on the outside surface 47 of right wall 38, and another aperture 53 formed on the inside surface 49 of the right wall 38.

Left wall 40 is formed to be similar to right wall 38, such that left wall 40 is formed to include a "D"-shaped aperture 54 having a slotted top access 56. Left wall 40 includes a rear mounting post 58 positioned immediately to the rear of slotted top access 56, and a front mounting post 60 positioned immediately in front of slotted top access 56. Outside surface 55 of left wall 40 additionally includes an aperture 57, and inside surface 59 includes an aperture 61.

As shown in FIGS. 1–4, small base 12 further includes a central pier 62 extending from front 64 of small base 12, the central pier 62 having a sloped top surface 66, a leading edge 68, a left pier wall 70, and a right pier wall 72. Left pier wall 70 includes an aperture 74, and right pier wall 72 includes an aperture 76. Rod 24 is inserted through apertures 51, 53, 57, 61, 74, and 76 such that rod 24 is supported in a fixed position by left wall 40, right wall 38, and central pier 62. Seat belt retaining surface 78 is sloped as defined by the "D"-shaped apertures 46, 54, providing an optimal angle for retention of the vehicle seat belt 16. Bottom support 80 is shown in FIG. 3 as a structural reinforcement for small base 12.

Seat shell 10 mounts on small base 12 in an interlocking fashion as described herein. In one embodiment, illustrated in FIGS. 12 and 13, interlock 92 comprises a mount 77 coupled to the small base 12 and a mount receiver 79 coupled to the seat shell 10. As shown in FIG. 1, mount receiver 79 includes a post receiving portion 82 on bottom 22 of seat shell 10. Mount receiver 79 further includes a second post receiving portion (not shown) on the opposite side of bottom 22. Mount 77 includes a right rear mounting post 50, a right front mounting post 52, a left rear mounting post 58, and a left front mounting post 60, as described above. As seat shell 10 is coupled with small base 12 in a manner indicated by arrow 63 of FIG. 13, post receiving portion 82 interlocks with right rear mounting post 50 and right front mounting post 52. The opposite post receiving portion (not shown) interlocks with left rear mounting post 58 and left front mounting post 60 in a similar fashion. An example of the interlocked and mounted position for seat shell 10 in vehicle seat 14 can be seen in FIG. 7.

Figure 12:
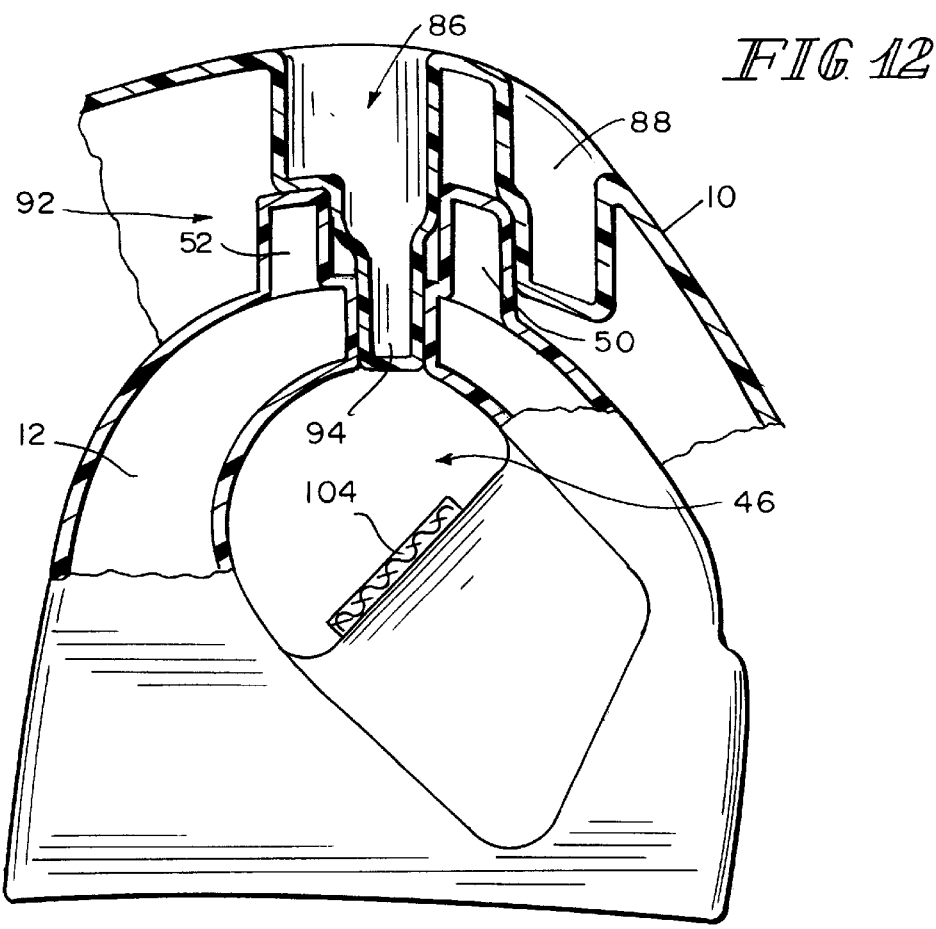
FIG. 12 is a sectional view taking along line 12—12 of FIG. 5, showing the tooth and rib of the seat shell and the mounting posts of the seat base in the mounted, interlocked position.

Post receiving portion 82 of seat shell 10 comprises, in one embodiment shown in FIGS. 12 and 13, a tooth 86 configured for interlocked positioning between rear mounting post 50 and front mounting post 52, and rib 88 configured for engagement with a rear side. 90 of rear mounting post 50. Tooth 86 and rib 88 cooperate with rear mounting post 50 and front mounting post 52 to form interlock 92, as shown in FIG. 12. Interlock 92 cooperates with latches 18, 20 and rod 24 to create a locking relationship between seat shell 10 and small base 12. Additionally, interlock 92 provides support for the seat shell in the event of a vehicle collision.

Tooth 86 is configured to have a tapered distal end 94, the distal end 94 fitting into the slotted top access 48 formed in the small base 12, as shown in FIG. 13. A slightly larger midsection 96 of tooth 86 is configured to fit between rear mounting post 50 and front mounting post 52. Base 98 of tooth 86 is dimensionally larger than midsection 96, and provides a stop contact surface 100 that engages top surface 102 of front mounting post 52, thereby preventing tooth 86 from over inserting into slotted top access 48, and simultaneously providing additional support to the interlock 92 structure.

The opposite post receiving portion (not shown) is similar to that of post receiving portion 82, and cooperates with left rear mounting post 58 and left front mounting post 60 to form a second interlock (not shown).

Small base 12 and seat shell 10 are mounted into vehicle seat 14 in the following manner. Small base 12 is positioned in vehicle seat 14 as shown in FIG. 4, and lap portion 104 of vehicle seat belt 16 is inserted between slotted top accesses 48, 56. Seat shell 10 is then positioned to engage small base 12 such that post receiving portions 82, 84 engage with mounting posts 50, 52, 58, and 60, and latches 18, 20 engage with first latching portion 26 and second latching portion 28 of rod 24, as shown in FIGS. 1, 10, 11, 12, and 13.

Figure 5:
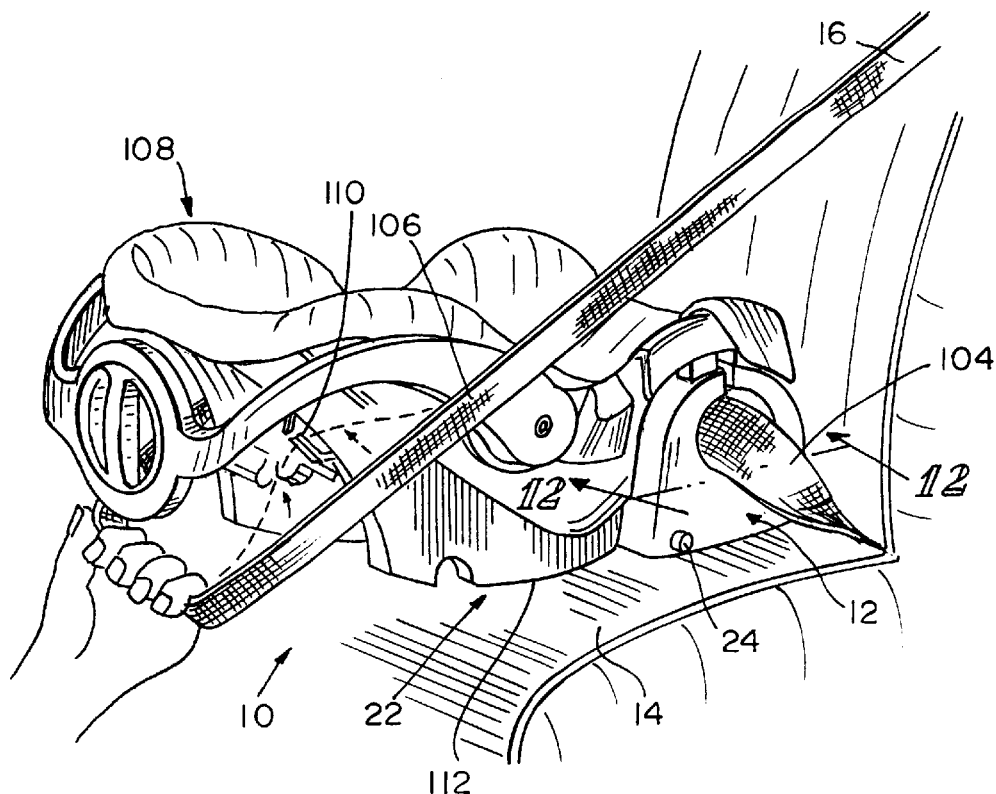
FIG. 5 is a perspective view of the seat base of FIG. 1 coupled to a vehicle seat and a seat shell coupled to the seat base, showing the back portion of the seat shell being secured with a shoulder strap held by a user, dotted lines representing the path through which the shoulder belt is passed.
Figure 6:
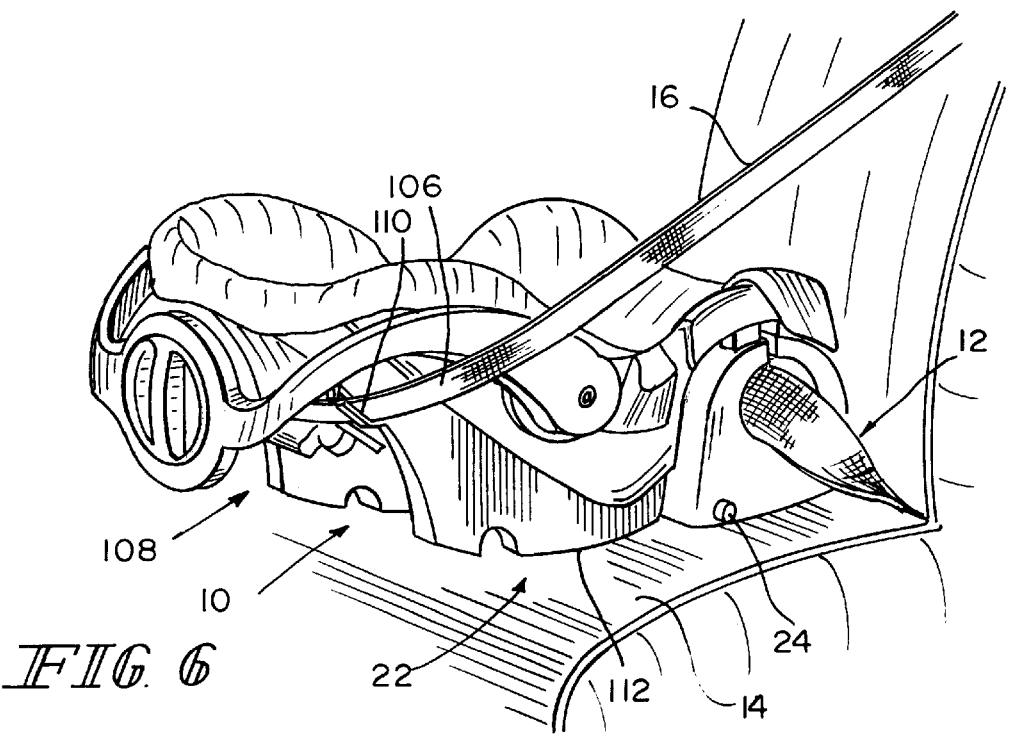
FIG. 6 is a perspective view of the seat shell coupled to the seat base, illustrating the secured position of the shoulder belt and the rearward-facing positioning of the seat shell.
Figure 7:
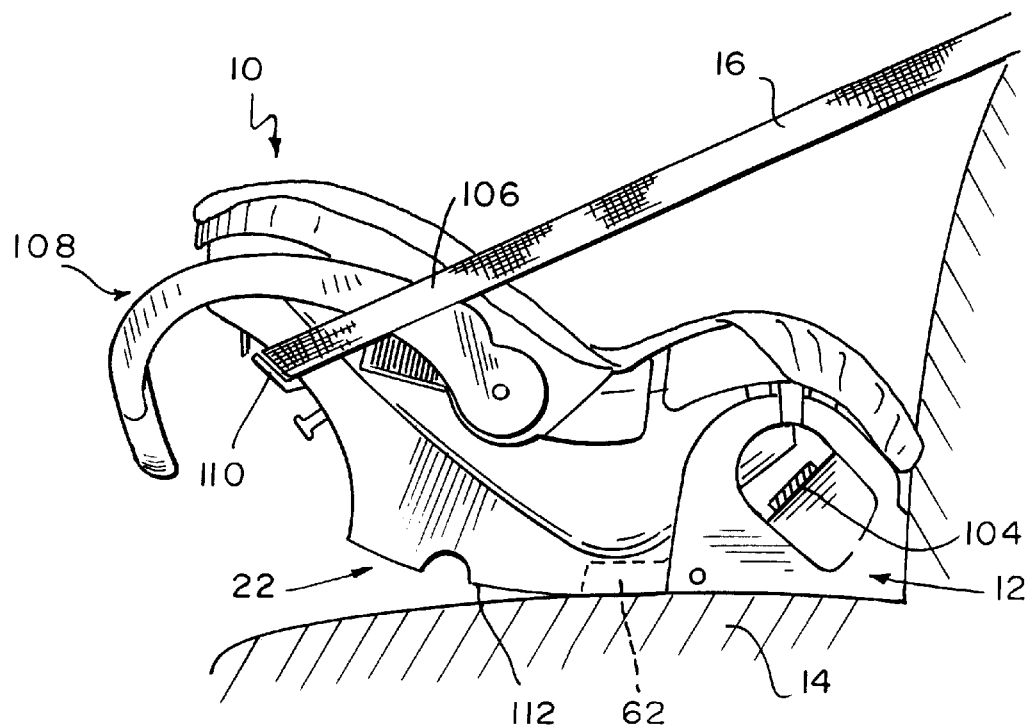
FIG. 7 is a side elevation view of the seat shell and seat base of FIG. 6, showing the positioning of the shoulder belt in relation to the seat shell, and showing the slot through which the lap belt is passed.
Figure 8:
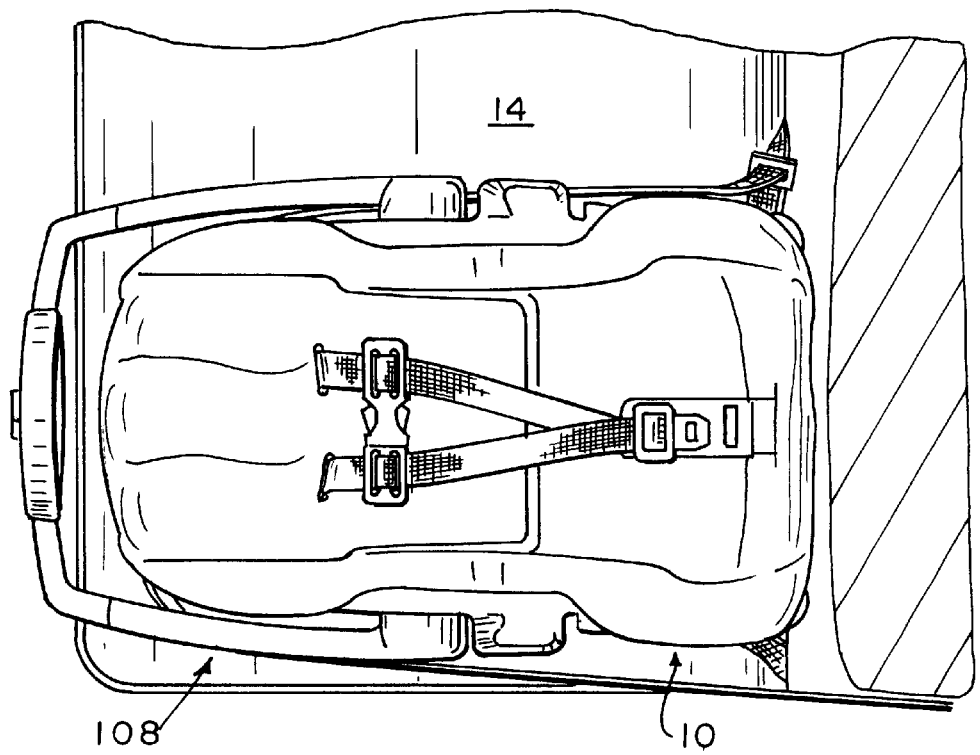
FIG. 8 is a top plan view of the seat shell and seat base of FIGS. 6 and 7, showing the arrangement of the seat shell, the shoulder belt, and the lap belt.

After seat shell 10 is engaged with small base 12, shoulder portion 106 of vehicle seat belt 16 is drawn to encompass the seat back 108 of seat shell 10, as shown in FIG. 5. Shoulder portion 106 of vehicle seat belt 16 is retained in place with strap retaining tab 110, as shown in FIGS. 6 and 7. As shown in FIGS. 5-7, a non-mounting portion 112 of the bottom 22 of the seat shell 10 does not contact small base 12 when seat shell 10 is engaged with small base 12. Additionally, a contact surface 114 of the non-mounting portion 112 lies directly on vehicle seat 14. Only a mounting portion 116 of bottom 22 of seat shell 10 is in contact with small base 12 when seat shell 10 is engaged with small base 12.

Seat shell 10 can additionally be mounted on a large base 118, as shown in FIG. 14, such that both the non-mounting portion 112 and the mounting portion 116 of bottom 22 lie directly on large base 118. Large base 118 includes a rod 120 similar to rod 24 of small base 12 for coupling with latches 18, 20 in a manner identical to that disclosed above. Additionally, in one embodiment, seat shell 10 can be mounted on a stroller 122, as indicated in FIG. 14. In this embodiment, stroller 122 includes a first latching portion 124 and a second latching portion 126 for coupling with latches 18, 20 such that a juvenile need not be removed from seat shell 10 when he or she is placed in the stroller 122.

Although the invention has been described in detail with reference to certain preferred embodiments, variations and modifications exist within the scope and spirit of the invention as described and defined in the following claims.

We claim:

1. A juvenile vehicle seat system comprising:

a seat base adapted to be mounted on a vehicle seat with a seat belt; and a seat shell having a bottom surface, the bottom surface including a mounting portion adapted to be coupled to the seat base and a non-mounting portion;

wherein the seat-shell is configured such that the non-mounting portion lies on the vehicle seat forwardly of the seat base when the mounting portion is coupled with the seat base.

2. The juvenile vehicle seat system of claim 1, further comprising an interlock adapted to secure the seat shell in a fixed position relative to the seat base when the seat shell is coupled with the seat base.

3. The juvenile vehicle seat system of claim 2, wherein the interlock comprises a mount coupled to the seat base and a mount receiver coupled to the seat shell, the mount and mount receiver interlocking to secure the mount receiver in a fixed position relative to the mount when the seat base is coupled to the seat shell.

4. The juvenile vehicle seat system of claim 3, wherein the mount comprises a post extending from the seat base.

5. The juvenile vehicle seat system of claim 3, wherein the seat base has a left side portion and a right side portion, and the mount comprises a first post and a second post extending from the left side portion of the seat base, and the mount further comprises a third post and a fourth post extending from the right side portion of the seat base.

6. The juvenile vehicle seat system of claim 5, wherein the mount receiver comprises a first tooth for interlocking engagement with the first post and the second post, and a second tooth for interlocking engagement with the third post and the fourth post.

7. The juvenile vehicle seat system of claim 2, further comprising a retainer for detachably coupling the seat shell to the seat base.

8. The juvenile vehicle seat system of claim 7, wherein the retainer comprises a movable latch member coupled to the seat shell and a rod coupled to the seat base.

9. A seat shell in combination with a first base and a second base, the seat shell comprising:

a seat shell having a bottom including a rearward mounting portion and a forward non-mounting portion, the mounting portion being configured to be interchangeably coupled with the first base and the second base;

wherein the first base is mountable on e vehicle se;at and configured to support the mounting portion and the non-mounting portion of the seat shell; and wherein the second base is mountable on the rearward portion of the vehicle seat and configured to support only the mounting portion of the seat shell with the non-mounting portion resting on the vehicle seat forwardly of the second base.

10. The combination of claim 9, further including a stroller configured for coupling with the mounting portion of the seat shell, wherein the mounting portion is configured to be interchangeably coupled with the first base, the second base, and the stroller.

11. The combination of claim 9, wherein the second base further comprises a mount and the seat shell further comprises a mount receiver, the mount and the mount receiver interlocking to secure the seat shell in a fixed position relative to the second base when the seat shell is coupled to the second base.

12. The combination of claim 9, further comprising a retainer for detachably coupling the seat shell to one of the first base and the second base.

13. The combination of claim 12, wherein the retainer comprises a movable latch member coupled to the seat shell and a first rod coupled to the first base and a second rod coupled to the second base.

14. A juvenile seat system comprising:

a seat base proportioned and designed to mount on the rearward portion of a vehicle seat to be held there byte vehicle seat belt leaving a forward portion of the vehicle seat open; and a seat shell having a bottom comprising a rearward mounting portion configured to engage the seat base and a forward portion configured to rest on the forward portion of the vehicle seat forwardly of the seat base.

15. The juvenile seat system of claim 14, further comprising an interlock adapted to secure the seat shell in a fixed position relative to the seat base when the seat shell is coupled with the seat base.

16. The juvenile seat system of claim 15, wherein the interlock comprises a mount coupled to the seat base and a mount receiver coupled to the seat shell, the mount and mount receiver interlocking to secure the mount receiver in a fixed position relative to the mount when the seat base is coupled to the seat shell.

17. The juvenile seat system of claim 16, wherein the mount comprises a post extending from the seat base.

18. The juvenile seat system of claim 16, wherein the seat base has a left side portion and a right side portion, and the mount comprises a first post and a second post extending from the left side portion of the seat base, and the mount further comprises a third post and a fourth post extending from the right side portion of the seat base.

19. The juvenile seat system of claim 18, wherein the mount receiver comprises a first tooth for interlocking engagement with the first post and the second post, and a second tooth for interlocking engagement with the third post and the fourth post.

20. The juvenile seat system of claim 15, further comprising a retainer for detachably coupling the seat shell to the seat base.

21. The juvenile seat system of claim 20, wherein the retainer comprises a movable latch member coupled to the seat shell and a rod coupled to the seat base.

* * * * *